(12) United States Patent
Chen et al.

(10) Patent No.: US 12,452,545 B2
(45) Date of Patent: Oct. 21, 2025

(54) SYSTEMS AND METHODS FOR DYNAMIC LIGHT CONTROL

(71) Applicant: Boston Scientific Scimed, Inc., Maple Grove, MN (US)

(72) Inventors: Longquan Chen, Lexington, MA (US); Thomas M. Zappia, Jr., West Boylston, MA (US); Nathan S. Fettinger, Minneapolis, MN (US); Jeffrey A. Meganck, North Grafton, MA (US); Niraj Prasad Rauniyar, Plymouth, MN (US); Leroy Jackson Longworth, Woodbury, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 0 days.

(21) Appl. No.: 18/652,888

(22) Filed: May 2, 2024

(65) Prior Publication Data

US 2024/0380985 A1 Nov. 14, 2024

Related U.S. Application Data

(60) Provisional application No. 63/501,013, filed on May 9, 2023.

(51) Int. Cl.
*H04N 5/235* (2006.01)
*A61B 1/00* (2006.01)
(Continued)

(52) U.S. Cl.
CPC ......... *H04N 23/74* (2023.01); *A61B 1/00009* (2013.01); *H04N 9/77* (2013.01); *H04N 23/71* (2023.01); *H04N 23/76* (2023.01)

(58) Field of Classification Search
CPC .......... H04N 23/74; H04N 9/77; H04N 23/71; H04N 23/76; A61B 1/00009; A61B 1/045; A61B 1/0655
See application file for complete search history.

(56) References Cited

U.S. PATENT DOCUMENTS

| 10,602,916 B2 * | 3/2020 | Ito ............................ G06T 5/92 |
| 2007/0081721 A1 * | 4/2007 | Xiao ........................ G06T 5/40 |
| | | 348/E5.073 |

(Continued)

FOREIGN PATENT DOCUMENTS

JP H05304678 A 11/1993

OTHER PUBLICATIONS

International Search Report and Written Opinion in International Application No. PCT/US2024/027338, mailed Jul. 29, 2024 (9 pages).

*Primary Examiner* — Howard D Brown, Jr.
(74) *Attorney, Agent, or Firm* — Bookoff McAndrews, PLLC (57) ABSTRACT

Systems and methods for modifying the luminance value of at least one image are discussed, e.g., including receiving a request to modify the luminance value of at least one image, determining a weighted frame luminance of the at least one image based on an imbalance factor, modifying the luminance value of the at least one image by changing at least one setting of the camera and/or the light source automatically or manually based on the determined weighted frame luminance, and causing to output to a graphical user interface a visualization of the at least one image with the modified luminance value.

20 Claims, 4 Drawing Sheets

(51) Int. Cl.
*A61B 1/04* (2006.01)
*H04N 9/77* (2006.01)
*H04N 23/71* (2023.01)
*H04N 23/74* (2023.01)
*H04N 23/76* (2023.01)

(56) References Cited

U.S. PATENT DOCUMENTS

2009/0073287 A1 3/2009 Shimizu
2017/0172392 A1 6/2017 Ito et al.
2023/0132998 A1 5/2023 Yamaki

* cited by examiner

SYSTEMS AND METHODS FOR DYNAMIC LIGHT CONTROL

CROSS-REFERENCE TO RELATED APPLICATIONS

This application claims the benefit of priority from U.S. Provisional Application No. 63/501,013, filed on May 9, 2023, which is incorporated by reference herein in its entirety.

TECHNICAL FIELD

Various aspects of the present disclosure relate generally to medical devices and related methods. More specifically, the present disclosure relates to systems and related methods for dynamic image modification, such as in endoscopy, urology, and other medical procedures.

BACKGROUND

Many medical procedures, such as endoscopy and urology procedures, use different light sources to visualize various anatomy and targets for treatment of a patient. Limited space and convoluted anatomy (e.g., narrow and twisting body passages, crowding together of different tissues, presence of abnormal tissues such as cysts, lumps, swelling, bleeding, stones, etc.) presents a challenging environment for obtaining accurate images. Features of interest may be difficult to visualize due to variable lighting conditions. For example, light may inadvertently activate autofluorescent properties of targets like kidney stones, leading to a combination of overexposed and underexposed regions. Similarly, changes in depth can lead to darkened frames are blackout regions. Such irregularities in an image can complicate analysis and negatively affect patient treatment. Adjusting the light source manually or based on the intensity across an entire image frame are often inadequate to account for these types of challenges.

SUMMARY

Various aspects of the present disclosure relate to, among other things, systems and related methods for dynamic light control in medical procedures, such as in endoscopy. Each of the aspects and examples disclosed herein may include one or more of the features described in connection with any of the other disclosed aspects and examples.

The present disclosure includes methods for dynamically modifying a luminance value of an image. For example, the method may include receiving, via one or more processors, a request to modify the luminance value of at least one image, the image including at least intensity data and color data, the at least one image generated by a system comprising a camera and a light source; determining a weighted frame luminance of the at least one image based on an imbalance factor; modifying the luminance value of the at least one image by changing at least one setting of the camera and/or the light source automatically or manually based on the determined weighted frame luminance, and obtaining the modified luminance value using the camera and the light source with the at least one changed setting; and causing to output to a graphical user interface (GUI) a visualization of the at least one image with the modified luminance value. The imbalance factor may be described by $$A^{\left(\frac{f\_m}{f\_bm} - C\right)},$$

wherein A is a positive integer greater than or equal to 1, f_m is an average frame luminance value of a Y channel, f_bm is an average frame luminance of a U channel, and C is a calibration value associated with the camera and the light source. The at least one image may be in RGB format, e.g., the method further comprising converting the at least one image from RGB format to YUV format before determining the weighted frame luminance. In some aspects, each of the average frame luminance value of the Y channel and the average frame luminance value of the U channel is an average of a plurality of grids of a frame of the at least one image, each grid including at least 12 pixels by 12 pixels, such as 48 pixels by 48 pixels. For example, the plurality of grids may include a matrix of at least 4 grids by 4 grids, such as a matrix of 8 grids by 8 grids. The at least one image may include a still image and/or a video image. Optionally, the method may further comprise automatically generating the request to modify the luminance value of the at least one image in response to determining that the luminance value of the at least one image exceeds an upper threshold value and/or is below a lower threshold value. In some examples, the calibration value C is within a range from 0.5 to 1.5, such as within a range from 0.6 to 0.8. Additionally or alternatively, A may be within a range from 1 to 10. The at least one image may include anatomy of a subject, such as one or more features of the subject's gastrointestinal system or renal system. The method may comprise automatically changing an exposure time of the camera and/or an intensity of the light source, and modifying the luminance value of the at least one image using the changed exposure time and/or the changed light intensity. The light source may be a light emitting diode (LED) and/or the camera is a complementary metal oxide semiconductor (CMOS) image sensor or charge-coupled device (CCD) image sensor. In some examples, the method further comprises determining a weighted frame luminance of the visualization of the at least one image with the modified luminance value, and generating a second visualization of the at least one image with a second modified luminance value by applying the determined weighted frame luminance to the at least one image.

The present disclosure further includes systems configured to perform methods as disclosed above and elsewhere herein. For example, the system may include at least one storage device each configured to store instructions; and at least one processor configured to execute the instructions to perform operations for dynamically modifying the luminance value of an image according to any one of the preceding claims, comprising: receiving a request to modify the luminance value of at least one image, the image including at least intensity data and color data, the at least one image generated by a system comprising a camera and a light source; determining a weighted frame luminance of the at least one image based on an imbalance factor; modifying the luminance value of the at least one image by: changing at least one setting of the camera and/or the light source automatically or manually based on the determined weighted frame luminance, and obtaining the modified luminance value using the camera and the light source with the at least one changed setting; and causing to output to a graphical user interface (GUI) a visualization of the at least one image with the modified luminance value.

The present disclosure further includes a method for dynamically modifying a luminance value of an image, including receiving, via one or more processors, a request to modify the luminance value of at least one image, the image including at least intensity data and color data, the at least one image generated by a system comprising a camera and a light source; determining a weighted frame luminance of the at least one image based on an imbalance factor, wherein the imbalance factor is $$A^{\left(\frac{f\_m}{f\_bm-C}\right)},$$

wherein A is a positive integer greater than or equal to 2, f_m is an average frame luminance value of the Y channel, f_bm is an average frame luminance of the U channel, and C is a calibration value associated with the camera and the light source, wherein A is within a range from 1 to 10 and the calibration value is within a range from 0.5 to 1.5; modifying the luminance value of the at least one image by changing at least one setting of at least one of the camera of the light source automatically or manually based on the determined weighted frame luminance, and obtaining the modified image using the camera and the light source with the at least one changed setting; and causing to output to a graphical user interface (GUI) a visualization of the at least one image with the modified luminance value. Each of the average frame luminance value of the Y channel and the average frame luminance value of the U channel may be an average across a frame of the at least one image, the frame including at least 8 grids by 8 grids, and each grid including at least 24 pixels by 24 pixels. The at least one image may be in RGB format, for example, and the method may further comprise converting the at least one image from RGB format to YUV format before determining the weighted frame luminance. According to some aspects, the methods further comprise automatically generating the request to modify the luminance value of the at least one image in response to detecting one of: (i) the luminance value exceeds an upper threshold value; or (ii) the luminance value of the at least one image is below a lower threshold value. The at least one image may include one or more features of a subject's gastrointestinal system or renal system.

The present disclosure further includes a system, including: at least one memory storing instructions; and at least one processor configured to execute the instructions to perform operations for dynamically modifying the luminance value of at least one image, the operations including: receiving, via one or more processors, a request to modify the luminance value of at least one image, the image including at least intensity data and color data, the at least one image generated by a system comprising a camera and a light source; determining a weighted frame luminance of the at least one image based on an imbalance factor; modifying the luminance value of the at least one image by changing at least one setting of the camera and/or the light source automatically or manually based on the determined weighted frame luminance, and obtaining the modified luminance value using the camera and the light source with the at least one changed setting; and causing to output to a graphical user interface (GUI) a visualization of the at least one image with the modified luminance value. The light source may be a light emitting diode (LED), for example, and/or the camera may be or comprise a CMOS image sensor or CCD image sensor. Each of the average frame luminance value of a Y channel and a U channel may be an average across a frame of the at least one image, the frame including at least 8 grids by 8 grids, and each grid including at least 24 pixels by 24 pixels.

BRIEF DESCRIPTION OF THE DRAWINGS

The accompanying drawings, which are incorporated in and constitute a part of this application, illustrate exemplary features of the present disclosure and together with the specification, serve to explain the principles of the disclosure.

DETAILED DESCRIPTION

It may be understood that both the foregoing general description and the following detailed description are exemplary and explanatory only and are not restrictive of the invention, as claimed. As used herein, the terms "comprises," "comprising," or any other variation thereof, are intended to cover a non-exclusive inclusion, such that a process, method, system, or device that comprises a list of elements does not include only those elements, but may include other elements not expressly listed or inherent to such process, method, system, or device. The term "exemplary" is used in the sense of "example" rather than "ideal." The terms "about" and "approximately" include values±10% of a stated value. All ranges are understood to include endpoints, e.g., a value ranging or within a range from 1 to 10 includes 1, 10, and all values between.

Reference will now be made in detail to aspects of the present disclosure described herein and illustrated in the accompanying drawings. Wherever possible, the same reference numbers will be used throughout the drawings to refer to the same or like parts. One or more aspects of the medical systems, devices, and methods discussed herein may be combined and/or used with one or more aspects of other medical systems, devices, and methods discussed herein. Reference to any particular procedure is provided in this disclosure for convenience and illustrative purposes, and not intended to limit the present disclosure. A person of ordinary skill in the art would recognize that the concepts underlying the disclosed medical systems, devices, and methods may be utilized in any suitable medical procedure.

During a medical procedure, a medical provider (e.g., a physician, assistant, or other medical professional) may use one or more medical devices equipped with imaging capability (e.g., an endoscope, ureteroscope, duodenoscope, colonoscope, etc.) to visualize and/or obtain still and/or video images of internal anatomy of a patient, such as the renal system, the gastrointestinal system, and/or other anatomy. Depending on the procedure, the images may be captured using various medical systems or devices thereof that include at least one camera and one or more light sources. For example, the medical system may include one or more image sensors and one or more light sources. The image sensor may comprise, for example, complementary metal oxide semiconductor (CMOS) sensor and/or a charge-coupled device (CCD) sensor. The light source(s) may comprise, for example, one or more light-emitting diodes (LEDs).

A light source may be referred to in some examples herein as a guiding light. The guiding light may be used to illuminate an area for visualization of target areas of the body and/or for navigation through passages of the body. Depending on the dimensionality of the target area, lighting conditions of the target area when taking an image may lead to overexposure of some features and underexposure of other features. Luminance refers to the intensity of light emitted from a surface per unit area in a given direction. Analysis of luminance across a frame can provide an indication of variability of light intensity and the presence of absence of image artifacts.

Various therapeutic tools used during the procedure also may contribute to variable lighting conditions that affect image quality. For example, a laser fiber used to break up stones during lithotripsy may generate light that can cause and/or contribute to image artifacts. The laser fiber may be used as an aiming beam to assist in identifying a target area and focusing on the area for treatment. The aiming beam may be capable of superimposing infrared (IR) treatment radiation, e.g., green or red treatment radiation, on a target area, e.g., a kidney stone, a gallstone, a bezoar, etc. Such targets typically comprise minerals and acid salts with crystalline structure capable of reflecting light. When light hits the crystalline material, the light may be reflected and result in various image artifacts such as hotspots (e.g., areas in an image frame that are overexposed) that mask detail of the underlying anatomy. Other therapeutic tools similarly may generate light and/or other forms of energy, which may affect image quality.

The lights used in medical procedures may interfere with visualization of various anatomical features. Tortuous anatomy combined with intensity gradients created when target objects vary in proximity to the camera and/or proximity to other targets within the body can result in image artifacts such as hot spots, shadows, blackouts, and/or darkened frames, among other artifacts. These artifacts may affect the luminance of an image, thereby interfering with visualization of the structures sought to be analyzed during a medical procedure. The methods herein may reduce and/or eliminate such effects on image luminance to improve the ability of a medical professional to accurately visualize a target area and capture images representative of patient anatomy.

While several of the examples herein involve lithotripsy, it should be understood that the systems and methods of the present disclosure may be adapted to any suitable medical system or procedure. It should also be understood that the following examples are illustrative only.

In an exemplary lithotripsy procedure, a ureteroscope may introduced into a subject's ureter and advanced into the kidney for treatment of kidney stones. The ureteroscope may include a camera, such as an image sensor (e.g., a CMOS or CCD sensor), a light source (used as a guiding light) such as one or more LEDs, and a working channel. A laser fiber, such as a holmium laser, may be inserted into the working channel and used as an aiming beam to target and break up kidney stones identified by visualization with the camera and light provided by the light source. Light from the guiding light and aiming beam in the narrow passages of the ureter and renal pelvis may lead to variations in luminance due to intensity gradients and image artifacts. Image quality may be improved by accounting for such variations in luminance using a weighted frame luminance determined via algorithm. The algorithm may apply the weighted frame luminance to the original luminance to generate a modified image. Additionally or alternatively, the algorithm may prompt a change in setting(s) of the camera and/or light source which may subsequently generate a modified luminance, resulting in an improved image, when used with the changed setting(s). Such settings may include, for example, camera exposure time, gain, and/or intensity of the light source. The modified image may be outputted via a display, such as a graphical user interface (GUI) associated with a computer and/or device.

Figure 1:
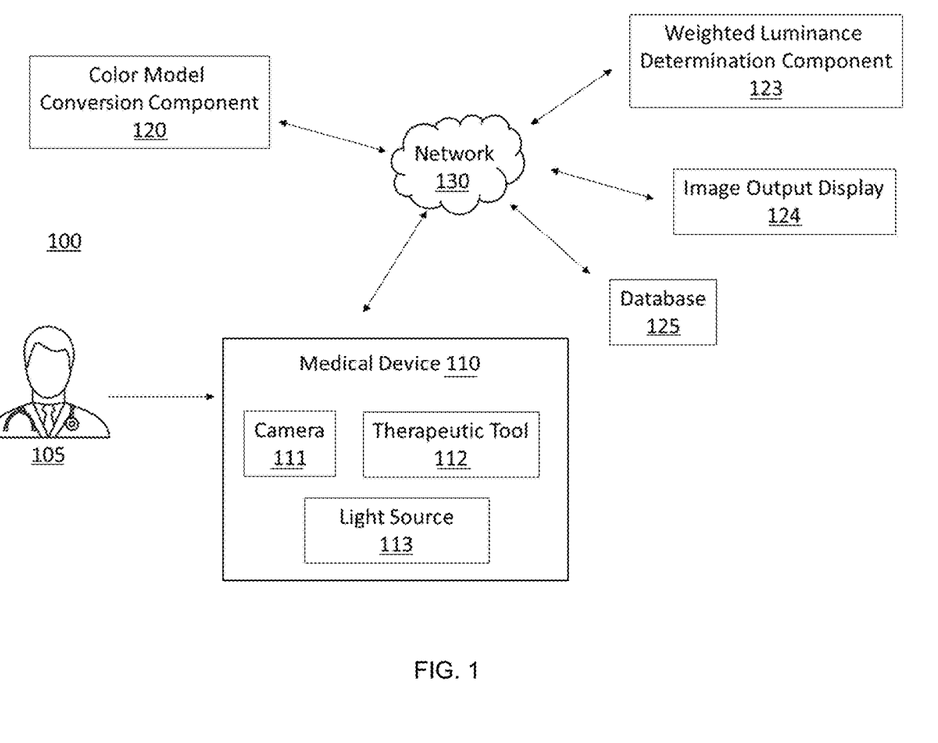
FIG. 1 depicts an exemplary environment and system for dynamically modifying an image, according to one or more aspects of the present disclosure.

FIG. 1 depicts an exemplary environment that includes a system for dynamically modifying luminance, according to one or more aspects of the present disclosure. Environment 100 depicts a user, e.g., medical provider 105, a medical device 110 (e.g., ureteroscope or endoscope), a color model conversion component 120, a weighted luminance determination component 123, an image output display 124, a database 125, and a network 130. An exemplary system within environment 100 may include camera 111, light source 113 (wherein camera 111 and light source 113 may be part of the same device as depicted in FIG. 1 or different devices), and weighted luminance determination component 123. Optionally, the system also may include color model conversion component 120, image output display 124, and/or database 125. In some examples, components of the system communicate across network 130. For example, components of environment 100 may communicate with one another via a wired or wireless connection (e.g., a wide area network (WAN), a local area network (LAN), personal area network (PAN), or the like). Color model conversion component 120 and/or weighted luminance determination component 123 may be systems or algorithms stored in memory of a computing device with instructions to be executed by a processor of the computing device.

Provider 105 may operate the medical device 110 and capture one or more images using a camera 111 and light source 113. The medical device 110 optionally may include, or be used together with, a therapeutic tool 112 capable of generating light and contributing to illumination of various anatomical features when capturing images with the camera 111. It should be noted that while FIG. 1 shows camera 111, therapeutic tool 112, and light source 113 together as part of medical device 110, any combination of camera 111 and light source 113 (together with, or in absence of, therapeutic tool 112), may be used in the systems and methods herein.

In some examples, the systems herein include format conversion of images, e.g., from RGB format to YUV format. FIG. 1 illustrates a color model conversion component 120 that may be used to obtain images, e.g., still or video images, from one or more aspects of environment 100, e.g., from medical device 110, camera 111, or database 125. The images may be analyzed by color model conversion component 120 and converted to various color models, e.g., RGB color model, RYB color model, YUV color model, Y'UV color model, CMY color model, CMYK color models, etc. For example, camera 111 may output RGB color model images wherein red, green and blue primary colors of light are added together in various ways to reproduce a broad array of colors. Color model conversion component 120 may be configured to convert the RGB color model image(s) to other formats, such as YUV. The YUV color model encodes a color image using one luminance component (Y), meaning physical linear-space brightness, and two chrominance components for blue projection (U) and red projection (V). One or more of the color models and/or color components of the images may be stored, e.g., in database 125. For example, the blue channel of an RGB color model image and the Y channel of an RGB-to-YUV converted image may be stored.

Color model conversion component 120 and/or another image processing component may be configured to process the image(s) into one or more channel-dependent frames. For example, color model conversion component 120 may divide the Y channel of an image into a plurality of grids, such as a matrix of at least 4 grids by 4 grids, e.g., at least 8 grids by 8 grids. Each grid may include a plurality of pixels, for example, each grid including at least 12 pixels by 12 pixels, at least 24 pixels by 24 pixels or at least 48 pixels by 48 pixels. In some examples, the grid may be centered on the image with a margin along each edge, such as a margin of at least 4 pixels, e.g., about 8 pixels along each edge. Color model conversion component 120 may be configured to divide the one or more images into channel-dependent frames prior to analysis by other aspects of the system within environment 100, e.g., weighted luminance determination component 123.

Figure 2:
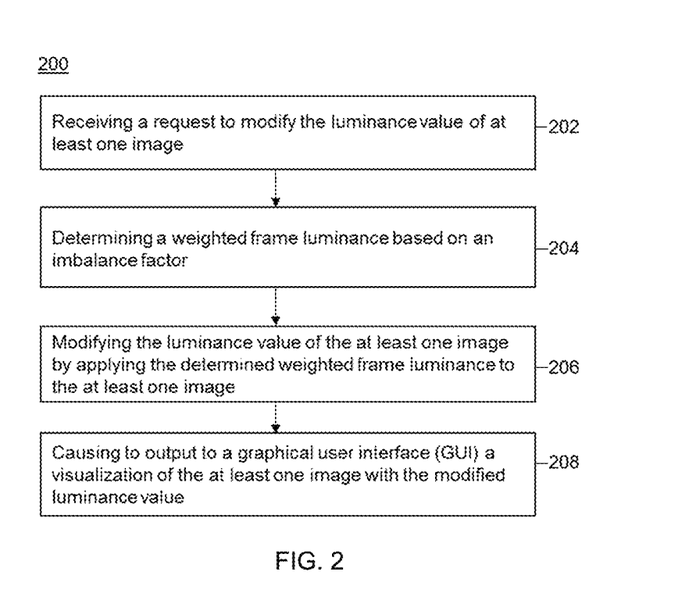
FIGS. 2 and 3 depict exemplary methods for dynamically modifying one or more images, according to some aspects of the present disclosure.

FIG. 2 depicts an exemplary method 200 for dynamically modifying a luminance value of an image (or one or more images) and/or consecutive frames, according to some aspects of the present disclosure, using a weighted luminance determination. While reference herein may be made to modification of an image, it should be understood that improvement of the luminance of consecutive frames is also contemplated in this terminology. At step 202, a request to modify the luminance value an image may be received, for example, from 110, camera 111, color model conversion component 120, or weighted luminance determination component 123, or from provider 105. In some aspects of the present disclosure, the request may be generated detecting the luminance value of the at least one image exceeds an upper threshold value or is below a lower threshold value. For example, if the luminance value of an image is determined to exceed a pre-determined threshold value, a request to reduce the luminance value may be generated. In other aspects of the present disclosure, the request may be generated automatically in response to detection of an image artifact, e.g., by color model conversion component 120, weighted luminance determination component 123, and/or by manual input from provider 105. For example, color model conversion component 120 may analyze one or more images from camera 111 in real-time to determine the presence or absence of artifacts and whether modification is required. If one or more artifacts, e.g., a hot spot, a shadow, a blackout, and/or a darkened frame or portion thereof, is detected in the image(s), color model conversion component 120 may generate a request for modification of the image(s), e.g., by weighted luminance determination component 123. The presence or absence of artifacts may be determined by analyzing variability in light intensity among neighboring grids within the frame.

At step 204, a weighted frame luminance may be determined. Weighted luminance determination component 123 may receive one or more images from medical device 110, color model conversion component 120, and/or database 125 and apply an algorithm to analyze light intensity gradients. As discussed above, the image(s) optionally may be converted to a suitable format, e.g., from RGB format to YUV format. The weighted frame luminance may be determined based on the RGB-formatted image(s) and/or the YUV-formatted image(s). For example, the weighted frame luminance of an image may be determined using Equation 1.

$$FrameLuminance = \frac{(f_m \times MeanWeight \times ImbalanceFactor) + (MaxElement_n \times MaxWeight)}{MeanWeight \times ImbalanceFactor + MaxWeight}$$

Equation 1 where $MaxElement_n$ is the maximum luminance of the plurality of grids of the image, and MeanWeight and MaxWeight are weighing factors to dynamically adjust for the imbalanced frame luminance.

The methods herein include determination of an imbalance factor using data from the Y channel and U channel of the image. For example, the imbalance factor may be a measure of imbalance between the Y channel and the U channel, represented by Equation 2

$$Imbalance\ Factor = A^{\left(\frac{f\_m}{f\_bm} - C\right)}$$

Equation 2 where A is a positive integer greater than 1, f_m is the average frame luminance value of the Y channel, f_bm is the average frame luminance of the U channel, and C is a calibration value associated with the camera and the light source. In some examples, A is within a range of 2 to 15, such as ranging from 3 to 12, from 5 to 10, from 2 to 10, or from 4 to 8. Further, for example, the calibration value C may range from about 0.5 to about 1.5, such as from about 0.5 to about 1.3, about 0.5 to about 1.0, about 0.5 to about 0.8, about 0.7 to about 1.0, about 0.7 to 0.8, about 0.6 to about 1.4, about 0.6 to about 1.2, about 0.6 to about 1.0, about 1.0 to about 1.5, about 1.2 to about 1.3, about 0.9 to about 1.1, about 0.6 to about 0.8, about 0.7 to about 1.5, or about 0.7 to about 1.2.

The average frame luminance for the Y channel ($f_m$) may be determined for an image, e.g., an image of 8 grids by 8 grids (64 total grids), according to Equation 3:

$$f_m = \frac{\sum_1^{64} Element_n}{64}$$

Equation 3 where $Element_n$ is the average luminance of each grid. Equation 3 may be adapted as needed for an image of 4 grids by 4 grids (16 total grids), etc., as appropriate.

Figure 3:
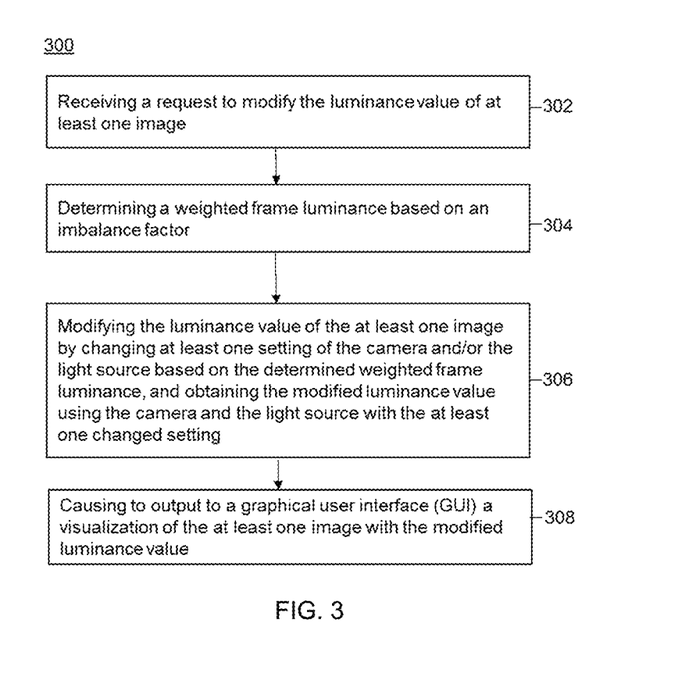

At step 206, the luminance value of at least one image may be modified and, at step 208, optionally outputted to a GUI or other suitable interface, e.g., image output display 124. Based on the weighted frame luminance determined at step 204, the luminance value may be modified, e.g., via weighted luminance determination component 123, to account for the weighted frame luminance. The luminance value may be modified manually and/or automatically. A visualization of the at least one image with the modified luminance value may be outputted in real-time, e.g., contemporaneously with collection of the original image via camera 111, or may be stored for display at a later time. Generating the modified image may be done by applying the determined weighted frame luminance to luminance value of the at least one image (FIG. 2), or by changing one or more settings used to obtain the original image based on the determined weighted frame luminance, and obtaining at least one image with the modified luminance value using the new settings (FIG. 3).

Figure 4A:
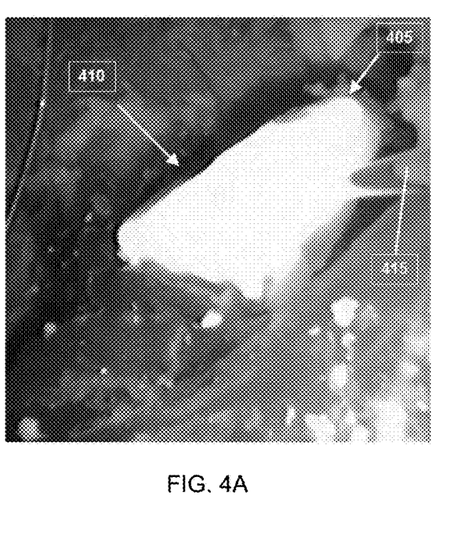
FIGS. 4A and 4B depict exemplary images taken during a medical procedure and including artifacts.
Figure 4B:
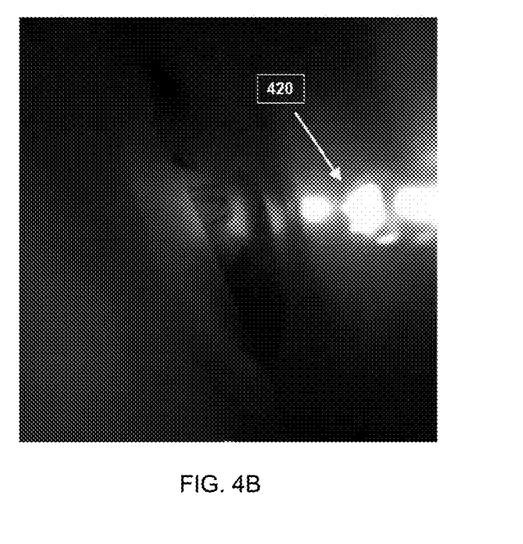

Exemplary image artifacts are shown in FIGS. 4A and 4B. FIG. 4A depicts an image of a patient's renal system that includes kidney stone 405. The image also includes an artifact in the form of a hot spot 410 due to reflection of light by the kidney stone 405 due to light from a laser fiber 415 used as an aiming beam. The hot spot 410 manifests as an overexposed region masking underlying detail of the kidney stone and surrounding environment. FIG. 4B depicts another image from a patient's renal system, wherein the image appears as a blacked out or darkened frame due to use of an aiming beam. In the darkened frame, light from the aiming beam 420 overwhelms the rest of the image, such that the surrounding region appears as a blacked-out area. Again, this artifact prevents visualization of the target area. It should be noted that while various types of artifacts are discussed herein, any cause of variation in luminance may be detected and corrected for using the one or more techniques described herein. For example, a decreased luminance value may be dynamically modified using techniques described herein whether the decreased luminance value is caused by a shadow, a blackout, or some other artifact or interference.

Figure 4C:
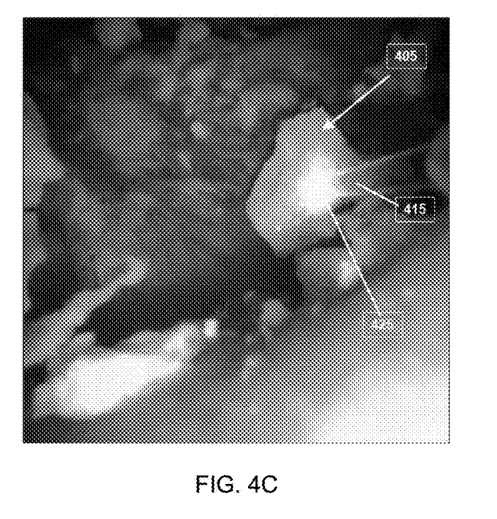
FIG. 4C depicts an exemplary application of a modified luminance value for an image according to some aspects of the present disclosure.

FIG. 4C depicts an exemplary modified image generated by determination of a weighted frame luminance according to the present disclosure and applying the determined weighted frame luminance to the original image, to account for intensity gradients due to an aiming beam focused on kidney stone 405. FIG. 4C illustrates reduced image artifacts caused by autofluorescence 425 of kidney stone 405 due to light from laser fiber 415. Comparing FIG. 4A to 4C, the methods herein provide for enhanced visualization of a target such as kidney stone 405.

As discussed above, the methods herein may include modifying the luminance value of at least one image by changing one or more settings of the camera and/or light source used to obtain an image with the modified luminance value based on the determined weighted frame luminance. The settings may be one or more hardware settings of the camera and/or the light source, such as exposure time of the camera and/or intensity of the light source. As illustrated in FIG. 3, the method 300 may include steps similar to those of method 200 discussed above. At step 302, a request to modify the luminance value of at least one image may be received, for example, from 110, camera 111, color model conversion component 120, or weighted luminance determination component 123, or from provider 105. The request may be generated automatically in response to detection of an image artifact, e.g., by color model conversion component 120, weighted luminance determination component 123, and/or by manual input from provider 105. At step 304, a weighted frame luminance of the image may be determined based on an imbalance factor, as discussed above in connection to step 204 of method 200. At step 306, a modified image may be generated with changed settings. For example, the weighted frame luminance determined in step 304 may be used to change a setting of the camera and/or light source used to obtain the original image (that is, the image from which the weighted frame luminance was determined), and the modified image with a modified luminance value may be obtained using the changed setting or settings. For example, one or more hardware settings, e.g., of camera 111 and/or light source 113, may be managed, controlled, etc. using a closed-loop system, e.g., a proportional-integral-derivative (PID) control. The PID system may employ a feedback system that continuously calculates an error value (e(t)) as the difference between a target frame luminance and the weighted frame luminance. The overall PID control function based on the e(t) may be determined according to Equation 4.

$$u(t) = K_p e(t) + K_i \int_0^t e(\tau)d\tau + K_d \frac{de(\tau)}{dt} \qquad \text{Equation 4}$$

In Equation 4, u(t) may change based on the light source, e.g., light source 113 and/or light from therapeutic tool 112. $K_p$, $K_i$, and $K_d$ denote the coefficients for the proportional, integral, and derivative terms, respectively. $K_p$, $K_i$, and $K_d$ may be determined based on experimentation.

In applying the overall PID control function, the one of more hardware settings, e.g., camera exposure time, LED level, etc., may be modified such that e(t) may be near or equal to a zero value. For example, the camera exposure time may be modified, e.g., increased or decreased, if the imbalance factor exceeds a predetermined value. In another example, if the average frame luminance is low, one or more values (e.g., the LED level, the weighted luminance, etc.) may be modified to increase the average frame luminance. In another example, if the average frame luminance is high, one or more values (e.g., the LED level, the weighted luminance, etc.) may be modified to decrease the average frame luminance.

In some techniques, a first modification of a high luminance value by the PID control may only partially reduce the average luminance and weighted luminance values. In some techniques, a second modification of the luminance value by the PID control may further reduce the average luminance and weighted luminance values, still above the desired value. A third modification of the luminance value by the PID control may reduce the average luminance and weighted luminance values such that the luminance is an ideal value for image visualization. Step 306 and/or method 300 may be repeated as many or as few times as necessary.

Figure 5:
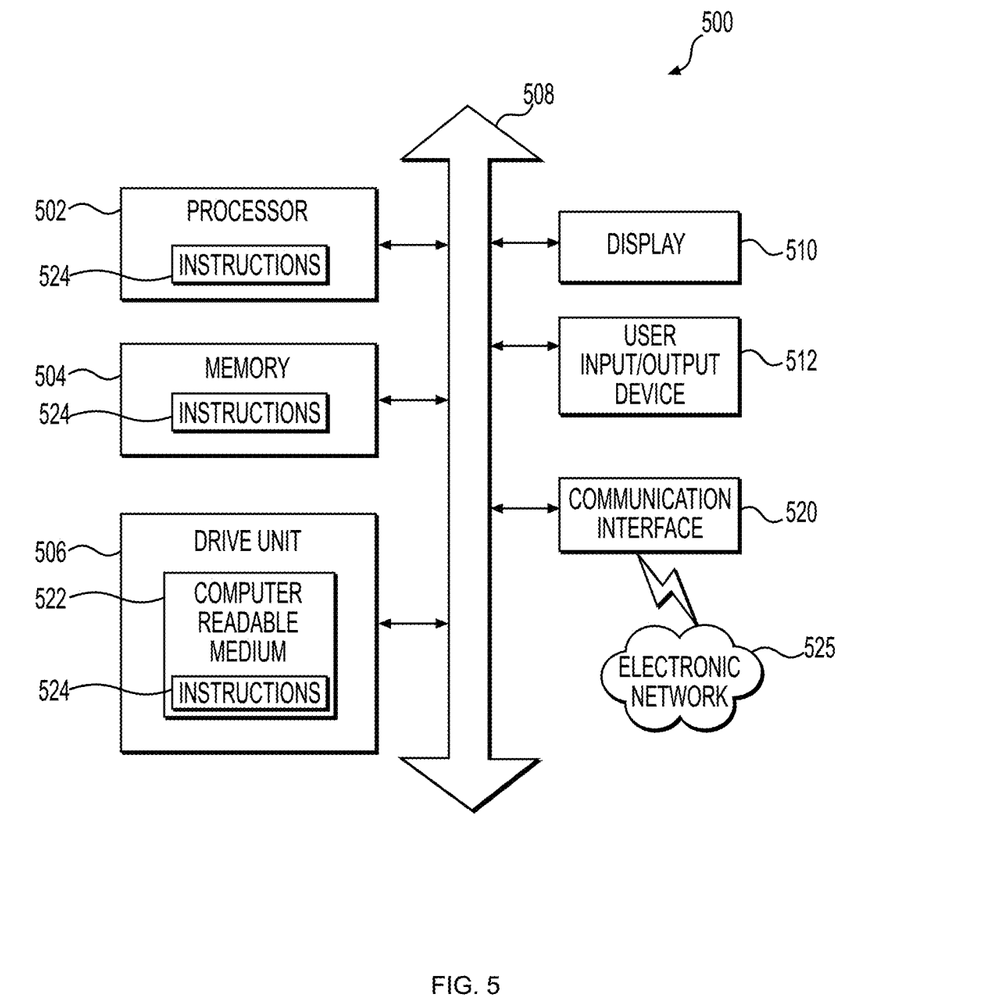
FIG. 5 depicts a simplified functional block diagram of a system, according to one or more aspects of the present disclosure.

FIG. 5 depicts a simplified functional block diagram of a computer or a computing device of a system useful for performing the methods herein. The system may include at least a memory storing instructions and one or more processors for executing the stored instructions. Computer 500 in FIG. 5 may include a data communication interface 520 for packet data communication, and a central processing unit (CPU), in the form of one or more processors 502, for executing program instructions. The computer 500 also may include an internal communication bus 508, and a storage unit 506 (such as ROM, HDD, SDD, etc.) that may store data on a computer readable medium 522, although the computer 500 may receive programming and data via network communications. The computer 500 may also have a memory 504 (such as RAM) storing instructions 524 for executing various steps of the methods herein, although the instructions 524 may be stored temporarily or permanently within other modules of computer 500 (e.g., processor 502 and/or computer readable medium 522). The computer 500 also may include input and output ports 512 and/or a display 510 to connect with input and output devices such as keyboards, mice, touchscreens, monitors, displays, etc. The computer 500 may communicate with one or more other computers, for example, using an electronic network 525 (e.g., via data communication interface 520). Electronic network 525 may include a wired or wireless network, for example, similar to the network 130 depicted in FIG. 1.

The various system functions may be implemented in a distributed fashion on a number of similar platforms, to distribute the processing load. Alternatively, the systems may be implemented by appropriate programming of one computer hardware platform.

It is intended that the specification and examples be considered as exemplary only, with a true scope and spirit of the present disclosure being indicated by the following claims.

The invention claimed is:

1. A method for dynamically modifying an image, the method comprising:
   receiving a request to modify a luminance value of at least one image, the at least one image including at least intensity data and color data, the at least one image generated by a system comprising a camera and a light source;
   determining a weighted frame luminance of the at least one image based on an imbalance factor;
   modifying the luminance value of the at least one image by changing at least one setting of the camera and/or the light source automatically or manually based on the determined weighted frame luminance, and obtaining the modified luminance value using the camera and the light source with the at least one changed setting; and
   causing to output to a graphical user interface (GUI) a visualization of the at least one image with the modified luminance value.

2. The method of claim 1, wherein the imbalance factor is $$A^{\left(\frac{f\_m}{f\_bm}-C\right)},$$

wherein A is a positive integer greater than or equal to 1, f_m is an average frame luminance value of a Y channel, f_bm is an average frame luminance of a U channel, and C is a calibration value associated with the camera and the light source.

3. The method of claim 1, wherein the at least one image is in RGB format and the method further comprises converting the at least one image from RGB format to YUV format before determining the weighted frame luminance.

4. The method of claim 2, wherein each of the average frame luminance value of the Y channel and the average frame luminance value of the U channel is an average of a plurality of grids of a frame of the at least one image, each grid including at least 12 pixels by 12 pixels.

5. The method of claim 4, wherein each grid includes 48 pixels by 48 pixels.

6. The method of claim 4, wherein the plurality of grids includes a matrix of at least 4 grids by 4 grids.

7. The method of claim 1, wherein the light source is a light emitting diode (LED) and the camera is a CMOS image sensor or CCD image sensor.

8. The method of claim 1, wherein the at least one image includes a still image or a video image.

9. The method of claim 1, further comprising automatically generating the request to modify the luminance value of the at least one image in response to detecting the luminance value of the at least one image exceeds an upper threshold value.

10. The method of claim 1, further comprising automatically generating the request to modify the luminance value of the at least one image in response to detecting the luminance value of the at least one image is below a lower threshold value.

11. The method of claim 2, wherein the calibration value is within a range from 0.5 to 1.5.

12. The method of claim 2, wherein A is within a range from 1 to 10.

13. The method of claim 1, wherein the at least one image includes one or more features of a subject's gastrointestinal system or renal system.

14. A method for dynamically modifying a luminance value of an image, the method comprising:
   receiving a request to modify the luminance value of at least one image, the at least one image including at least intensity data and color data, the at least one image generated by a system comprising a camera and a light source;
   determining a weighted frame luminance of the at least one image based on an imbalance factor, wherein the imbalance factor is $$A^{\left(\frac{f\_m}{f\_bm}-C\right)},$$

wherein A is a positive integer greater than or equal to 2, f_m is an average frame luminance value of a Y channel, f_bm is an average frame luminance of a U channel, and C is a calibration value associated with the camera and the light source, wherein A is within a range from 1 to 10 and the calibration value is within a range from 0.5 to 1.5;
   modifying the luminance value of the at least one image by changing at least one setting of at least one of the camera or the light source automatically or manually based on the determined weighted frame luminance, and obtaining the modified luminance value using the camera and the light source with the at least one changed setting; and
   causing to output to a graphical user interface (GUI) a visualization of the at least one image with the modified luminance value.

15. The method of claim 14, wherein each of the average frame luminance value of the Y channel and the average frame luminance value of the U channel is an average across a frame of the at least one image, the frame including at least 8 grids by 8 grids, and each grid including at least 24 pixels by 24 pixels.

16. The method of claim 14, wherein the at least one image is in RGB format and the method further comprises converting the at least one image from RGB format to YUV format before determining the weighted frame luminance.

17. The method of claim 14, further comprising automatically generating the request to modify the luminance value of the at least one image in response to detecting one of:
   (i) the luminance value exceeds an upper threshold value; or
   (ii) the luminance value of the at least one image is below a lower threshold value.

18. The method of claim 14, wherein the at least one image includes one or more features of a subject's gastrointestinal system or renal system.

19. A system comprising:
   at least one memory storing instructions; and
   at least one processor configured to execute the instructions to perform operations for dynamically modifying a luminance value of at least one image, the operations including:
      receiving a request to modify the luminance value of at least one image, the at least one image including at least intensity data and color data, the at least one image generated by a system comprising a camera and a light source;

determining a weighted frame luminance of the at least one image based on an imbalance factor;

modifying the luminance value of the at least one image by changing at least one setting of the camera and/or the light source automatically or manually based on the determined weighted frame luminance, and obtaining the modified luminance value using the camera and the light source with the at least one changed setting; and causing to output to a graphical user interface (GUI) a visualization of the at least one image with the modified luminance value.

20. The system of claim 19, wherein each of an average frame luminance value of a Y channel and an average frame luminance value of a U channel is an average across a frame of the at least one image, the frame including at least 8 grids by 8 grids, and each grid including at least 24 pixels by 24 pixels.

\* \* \* \* \*